United States Patent
Egawa (10) Patent No.: US 7,823,399 B2
(45) Date of Patent: Nov. 2, 2010

(54) VEHICULAR AIR CONDITIONING SYSTEM AND AIR CONDITIONING METHOD

(75) Inventor: Yukio Egawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 436 days.

(21) Appl. No.: 11/990,742

(22) PCT Filed: Jul. 31, 2006

(86) PCT No.: PCT/IB2006/002078

§ 371 (c)(1),
(2), (4) Date: Feb. 21, 2008

(87) PCT Pub. No.: WO2007/023340

PCT Pub. Date: Mar. 1, 2007

(65) Prior Publication Data
US 2009/0133417 A1    May 28, 2009

(30) Foreign Application Priority Data
Aug. 22, 2005 (JP) .............................. 2005-240129

(51) Int. Cl.
  F25D 17/00 (2006.01)
  B60H 1/32 (2006.01)
(52) U.S. Cl. ............................ 62/178; 62/244; 165/204
(58) Field of Classification Search .................. 62/178, 62/180, 186, 244; 165/202, 204
See application file for complete search history.

(56) References Cited

U.S. PATENT DOCUMENTS

| 5,361,593 | A * | 11/1994 | Dauvergne | 62/89 |
| 5,896,750 | A * | 4/1999 | Karl | 62/236 |
| 6,745,582 | B1 * | 6/2004 | Urbank et al. | 62/133 |
| 6,886,352 | B2 * | 5/2005 | Yoshinori et al. | 62/157 |
| 7,441,414 | B2 * | 10/2008 | Ziehr et al. | 62/244 |

(Continued)

FOREIGN PATENT DOCUMENTS

DE    199 60 562    12/2000

(Continued)

OTHER PUBLICATIONS

International Search Report dated Nov. 2, 2006.

(Continued)

*Primary Examiner*—Marc E Norman
(74) *Attorney, Agent, or Firm*—Finnegan, Henderson, Farabow, Garrett & Dunner, LLP (57) ABSTRACT

When there is a command for pre-air conditioning to be performed, an inlet switches to an inside air recirculating mode and a compressor and a blower fan are driven to blow air that was drawn in toward a lower portion in a vehicle cabin (130 to 136). Then when a door switch detects that an occupant may get into the vehicle (100, 102), air is blown from an outlet toward the upper portion in the vehicle cabin while the inlet remains in the inside air recirculation mode (114 to 124). That is, cooled air in the lower portion in the vehicle cabin is drawn in, cooled, and then blown toward the occupant. Also, when starting the pre-air conditioning, the battery state-of-charge is detected and pre-air conditioning is prohibited if the battery state-of-charge is less than a predetermined value (116, 126, 128).

13 Claims, 4 Drawing Sheets

U.S. PATENT DOCUMENTS

2004/0200228 A1 10/2004 Yanagimachi et al.

FOREIGN PATENT DOCUMENTS

| FR | 2 818 197 | 6/2002 |
| JP | 11-139155 | 5/1999 |
| JP | 2003-237358 | 8/2003 |
| JP | 2004-106694 | 4/2004 |
| JP | 2004-230936 | 8/2004 |
| JP | 2004-291759 | 10/2004 |

OTHER PUBLICATIONS

Written Opinion of the ISR.
Korean Office Action dated Dec. 8, 2008.
Japanese Office Action dated Sep. 9, 2008.

* cited by examiner

VEHICULAR AIR CONDITIONING SYSTEM AND AIR CONDITIONING METHOD

BACKGROUND OF THE INVENTION

1. Field of the Invention

The invention relates to a vehicular air conditioning system and air conditioning method. More particularly, the invention relates to a vehicular air conditioning system and air conditioning method provided with a pre-air conditioning function which air conditions a vehicle cabin before an occupant gets into the vehicle.

2. Description of the Related Art

In recent years, various technologies have been proposed to perform so-called pre-air conditioning which air conditions a vehicle cabin before an occupant gets into the vehicle according to a command by an occupant using remote control, for example, or a timer setting or the like.

For example, the technology disclosed in Japanese Patent Application Publication No. JP-A-2003-237358 performs pre-air conditioning by blowing cold air that was cooled by a cooling unit to a temperature lower than the temperature inside the vehicle cabin from an air outlet at a low rate at which the cooled air does not mix with the air in the vehicle cabin. As a result, the cold air gradually accumulates at a low level in the vehicle cabin from above a front seat, which is in a lower portion in the vehicle cabin, due to both the fact that the specific gravity of the cold air is greater than that of the air in the vehicle cabin because its temperature is lower than that of the air inside the vehicle cabin, and the fact that the cold air is blown at a rate at which it does not mix with the air in the vehicle cabin. Accordingly, an uncomfortable sensation is not imparted on the occupant when the occupant gets into the vehicle again. Further, a blower fan is driven to produce extremely little airflow, which enables energy consumption to be reduced.

The problem with the technology disclosed in Japanese Patent Application Publication No. JP-A-2003-237358, however, is that it only accumulates cold air at a low level inside the vehicle cabin, so when the occupant gets into the vehicle, the temperature of the air around the upper body of the occupant is still warm. Thus, that technology is unable to give the occupant a comfortable sensation.

DISCLOSURE OF THE INVENTION

It is an object of this invention to give an occupant a comfortable sensation when the occupant gets into a vehicle.

Therefore, a first aspect of the invention relates to an air conditioning system for a vehicle, which is capable of performing pre-air conditioning in which a vehicle cabin is air conditioned before an occupant gets into the vehicle and which includes an inlet in which an air intake source is changeable, an outlet in which the blowing direction of either air that has been drawn in from the inlet or air that has been drawn in from the inlet and cooled using a refrigerant cycle which circulates a refrigerant is changeable, and controlling means for controlling the air conditioning system to blow cooled air from the outlet toward a lower portion in the vehicle cabin during the pre-air conditioning, and controlling the air conditioning system to draw in air from the lower portion in the vehicle cabin through the inlet and blow cooled air from the outlet toward an upper portion in the vehicle cabin when it has been predicted that the occupant will get into the vehicle by predicting means for predicting that the occupant will get into the vehicle.

According to the first aspect, the air conditioning system which is capable of performing pre-air conditioning in which a vehicle cabin is air conditioned before an occupant gets into the vehicle, has an inlet in which an air intake source is changeable, and an outlet in which the blowing direction of either air that has been drawn in from the inlet or air which has been drawn in from the inlet and cooled using a refrigerant cycle which circulates a refrigerant is changeable.

The air intake source of the inlet draws in air with the lower portion in the vehicle cabin as the intake source or draws in outside air with outside the vehicle cabin as the intake source, for example. Also, the outlet blows air into the lower portion in the vehicle cabin or blows air into the upper portion of the vehicle cabin, for example.

Also, the controlling means controls the air conditioning system to blow air that was cooled using the refrigeration cycle from the outlet into a lower portion in the vehicle cabin during the pre-air conditioning, and controls the air conditioning system to draw in air from a lower portion in the vehicle cabin through the inlet and blow air that was cooled using the refrigeration cycle from the outlet toward the upper portion in the vehicle cabin when it has been predicted that the occupant will get into the vehicle by the predicting means for predicting that the occupant will get into the vehicle.

That is, when pre-air conditioning is performed, a space with low temperature air is created in the lower portion of the vehicle cabin by blowing cooled air into that lower portion of the vehicle cabin until an occupant gets into the vehicle. Then when the occupant has gotten into the vehicle, air that was drawn in from the space of low temperature air is cooled using the refrigeration cycle and blown into the upper portion in the vehicle cabin, i.e., blown at the upper body of the occupant. As a result, air that was efficiently cooled can be blown at the upper body of the occupant, thus giving the occupant a comfortable sensation when the occupant gets into the vehicle.

Also, low temperature air is cooled and blown into the vehicle cabin, thus making it possible to give the occupant a comfortable sensation efficiently and with less energy.

In the first aspect described above, the controlling means may first control the air conditioning system to draw in outside air from the inlet and blow air from the outlet during the pre-air conditioning. First drawing in outside air through the inlet and blowing the air from the outlet in this way enables warm air to be expelled, thereby enabling pre-air conditioning to be performed efficiently with less energy.

Further, the first aspect described above may also include calculating means for calculating a cooling load necessary to bring the temperature in the vehicle cabin to a target temperature, and during the pre-air conditioning, the controlling means may control the air conditioning system to draw in outside air from the inlet and blow air from the outlet until a calculation result of the calculating means becomes equal to or less than a predetermined value. Even if outside air is first drawn in from the inlet and air is blown from the outlet until the cooling load becomes equal to or less than a predetermined value in this way, warm air can still be expelled so pre-air conditioning can be performed efficiently with less energy.

Also in the first aspect described above, when it has been predicted by the predicting means that the occupant will get into the vehicle, the controlling means may control the air conditioning system to first draw in outside air from the inlet and blow air from the outlet toward the upper portion in the vehicle cabin for a predetermined period of time, and then draw in air from the lower portion in the vehicle cabin by the inlet and blow cooled air from the outlet to the upper portion in the vehicle cabin. Blowing air that was cooled using the refrigeration cycle into the upper portion in the vehicle cabin after expelling warm air in the upper portion of the vehicle cabin by drawing in outside air and blowing air into the upper portion of the vehicle cabin in this way enables the cooling efficiency to be improved and makes, it possible to give the occupant a comfortable sensation even earlier Further, the first aspect may also include calculating means for calculating a cooling load necessary to bring the temperature in the vehicle cabin to a target temperature, and the controlling means may control the air conditioning system to start the pre-air conditioning when a calculation result of the calculating means is equal to or greater than a predetermined value. Starting pre-air conditioning when the cooling load is equal to or greater than the predetermined value in this way makes it possible to inhibit air conditioning from being performed more than is necessary, which in turn making it possible to save energy.

Moreover in the first aspect, the controlling means may detect an amount of electricity stored in electrical storing means for storing electric power used to drive a compressor for circulating the refrigerant of the refrigerant cycle, and prohibit the pre-air conditioning when the detected amount of electricity stored is less than a predetermined value. That is, when there is not much power to drive the compressor, pre-air conditioning is prohibited, which makes it possible to prevent a situation in which the amount of electricity stored in the electrical storing means is reduced to zero.

A second aspect of the invention relates to an air conditioning method for a vehicle provided with an air conditioning system which is capable of performing pre-air conditioning in which a vehicle cabin is air conditioned before an occupant gets into the vehicle and which includes an inlet in which an air intake source is changeable and an outlet in which the blowing direction of either air that has been drawn in from the inlet or air that has been drawn in from the inlet and cooled using a refrigerant cycle which circulates a refrigerant is changeable, which includes the steps of controlling the air conditioning system to blow cooled air from the outlet toward a lower portion in the vehicle cabin during the pre-air conditioning, and controlling the air conditioning system to draw in air from the lower portion in the vehicle cabin through the inlet and blow cooled air from the outlet toward an upper portion in the vehicle cabin when it has been predicted that the occupant will get into the vehicle.

According to the invention as described above, when the pre-air conditioning is performed, cooled air is blown into a lower portion in the vehicle cabin until the occupant gets into the vehicle, and then air drawn in from the lower portion in the vehicle cabin is cooled and blown into the upper portion in the vehicle cabin when the occupant has gotten into the vehicle. Accordingly, air that was efficiently cooled can be blown at the upper body of the occupant, thus giving the occupant a comfortable sensation when the occupant gets into the vehicle.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
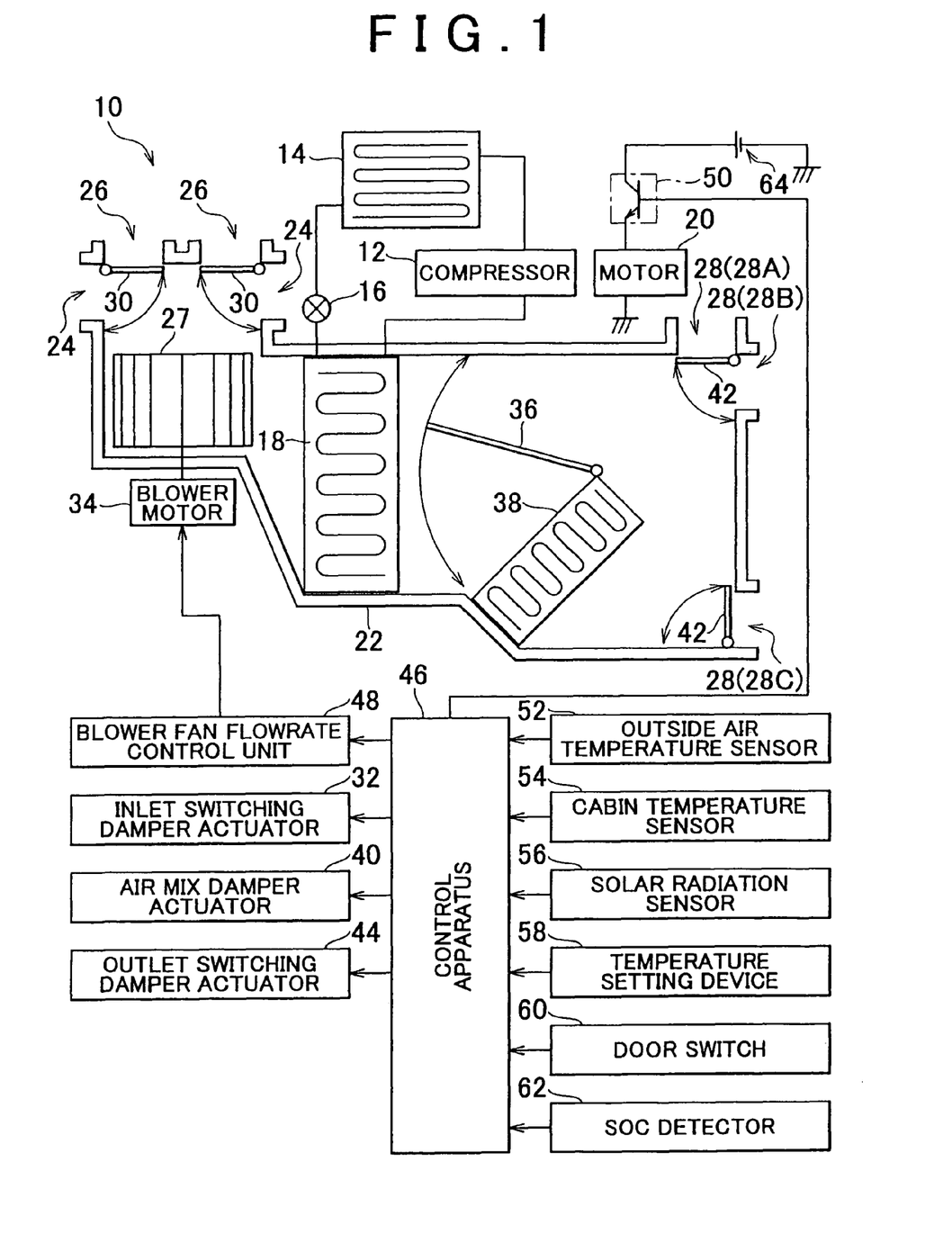
FIG. 1 is a diagram showing the structure of an air conditioning system for a vehicle according to one example embodiment of the invention.

An example embodiment of the invention will hereinafter be described in detail with reference to the drawings. FIG. 1 is a diagram showing the structure of an air conditioning system for a vehicle according to one example embodiment of the invention.

In an air conditioning system for a vehicle (hereinafter simply referred to as "air conditioning system") 10 according to the example embodiment of the invention, a cooling cycle is refrigeration cycle is formed by a refrigerant circulation circuit which includes a compressor 12, a condenser 14, an expansion valve 16, and an evaporator 18.

The evaporator 18 cools air passing through the evaporator 18 (hereinafter, this air will be referred to as "post evaporator air") by vaporizing a compressed liquid refrigerant. At this time, moisture in the air is condensed when the passing air is cooled, such that the post evaporator 18 air is dehumidified.

The expansion valve 16 provided upstream of the evaporator 18 drastically reduces the pressure of the liquid refrigerant, thereby condensing it, and supplies it to the evaporator, which increases the vaporizing efficiency of the refrigerant by the evaporator 18.

In this example embodiment, the compressor 12 of the air conditioning system 10 applies an electric compressor such that the refrigerant can be circulated by a motor 20 even when the power source (such as an engine or motor or the like) of the vehicle is not operating. The compressor 12 may also structured such that it can be driven by power from a vehicle power source when the power source of the vehicle is operating. Also, when power from the vehicle power source is used, a mechanical compressor may be used instead of the electric compressor.

The evaporator 18 of the air conditioning system 10 is provided in an air conditioning duct 22. Both ends of this air conditioning duct 22 are open, with air inlets 24 and 26 formed at one open end and a plurality of air outlets 28 (in the drawing they are shown as 28A, 28B, and 28C as one example in this example embodiment) formed at the other open end.

The air inlet 26 is communicated to outside the vehicle and can introduced outside air into the air conditioning duct 22. The air inlet 24, on the other hand, is communicated to inside the vehicle cabin and can introduce air (inside air) from the lower portion in the vehicle cabin into the air conditioning duct 22. In this example embodiment, the air outlets 28 include a defrost outlet 28A (DEF) that blows air toward a windshield glass, a side and center register outlet 28B (Vent) that can blow air toward the upper portion in the vehicle cabin, and a leg lower outlet 28C (Heat) that blows air toward the lower portion in the vehicle cabin.

A blower fan 27 is provided between the evaporator 18 and the air inlets 24 and 26 in the air conditioning duct 22. Also, inlet switching dampers 30 are provided near the air inlets 24 and 26. The intake switching dampers 30 exclusively open or close the air inlets 24 and 26 by operation of an inlet switching damper actuator 32.

The blower fan 27 is driven to rotate by a blower motor 34 such that air is drawn into the air conditioning duct 22 from the air inlets 24 and 26 and delivered to the evaporator 18. At this time, either outside air or inside air is introduced into the air conditioning duct 22 depending on which of the air inlets 24 or 26 is open and which of the air inlets 24 or 26 is closed by the inlet switching dampers 30. That is, the inlet switching dampers 30 switch the air conditioning mode between an inside air recirculation mode and an outside air introduction mode.

An air mix damper 36 and a heater core 38 are provided downstream of the evaporator 18. The air mix damper 36 is rotated by driving an air mix damper actuator 40 to adjust the amount of post evaporator 18 air that passes through the heater core 38 and the amount of air that bypasses the heater core 38. The heater core 38 heats air that is guided by the air mix damper 36.

The post evaporator 18 air is thus guided into the heater core 38 according to the opening amount of the air mix damper 36 and heated. That heated air then mixes with the air that was not heated by the heater core 38 and is delivered to the air outlets 28. The air conditioning system 10 regulates the temperature of the air blown from the air outlets 28 into the vehicle cabin by adjusting the amount of air that is heated by the heater core 38, which is done by controlling the air mix damper 36.

Outlet switching dampers 42 are provided near the air outlets 28. The air conditioning system 10 is able to blow temperature-regulated air into the vehicle cabin from a desired location by opening or closing the air outlets 28A, 28B, and 28C by the outlet switching dampers 42. The outlet switching dampers 42 are operated by driving an outlet switching damper actuator 44 according, to the operating mode that the air conditioning system 10 is set to.

Also, the air conditioning system 10 also includes a control apparatus 46 for performing various controls of the air conditioning system 10. This control apparatus 46 is connected to a blower fan flowrate control unit 48 that controls the rotation speed of the blower fan 27; the inlet switching damper actuator 32, the air mix damper actuator 40, the outlet switching damper actuator 44; a control switch 50 that controls the motor 20 which drives the compressor 12; an outside air temperature sensor 52; a cabin temperature sensor 54; and a solar radiation sensor 56. The control apparatus 46 is also connected to a temperature setting device 58 that sets the temperature of the air conditioning system 10 and selects the outlets 28, and the like. The control apparatus 46 receives detection values from the outside air temperature sensor 52, the cabin temperature sensor 54, and the solar radiation sensor 56 and performs various controls according to the setting of the temperature setting device 58 and the like based on the detection values from the various sensors. The blower fan flowrate control unit 48 can apply a device such as a power transistor. When a power transistor is used, the rotation speed of the blower fan 27 can be changed by changing the duty ratio of the voltage applied to the base of the power transistor.

Further, the control apparatus 46 is also connected to a door switch 60 for predicting when an occupant will get into the vehicle by detecting the opening and closing of a door, and a state-of-charge (SOC) detector 62 that detects the state-of-charge (SOC) of a battery 64 which serves as the power source for the compressor 12. The detection results from those devices are input to the control apparatus 46. A known method such as that disclosed in Japanese Patent Application Publication No. JP-A-2001-164960 can be used to detect the SOC of the battery 64 by the SOC detector 62. That is, any one of various methods can be used, such as a method which detects the SOC by measuring the specific gravity of the battery electrolyte and the mass of the entire battery 64, a method which detects the SOC by calculating the current values of charge and discharge and time, or a method which detects the SOC by instantaneously shorting the circuit between the terminals of the battery 64, running a current through it, and measuring the internal resistance.

Moreover, and more specifically, the air conditioning system 10 according to the example embodiment is provided with a pre-air conditioning function that performs air conditioning before an occupant gets into the vehicle, and is capable of driving the compressor 12 and the various motors using electric power from the battery 64 mounted in the vehicle. Pre-air conditioning can be started by the user using remote control or a timer setting or the like. In this example embodiment, pre-air conditioning is performed using electric power from the battery 64. Alternatively, however, instead of using electricity from the battery, power from a power source for running the vehicle, such as an engine or motor, may be used when pre-air conditioning is performed.

Continuing on, operation of the air conditioning system 10 having the foregoing structure will now be described. First, a routine executed by the control apparatus 46 when performing normal air conditioning will be described.

That is, upon receiving a command to start air conditioning by the temperature setting device 58 or the like, the control apparatus 46 reads the detection values detected by the outside air sensor 52, the cabin temperature sensor 54, and the solar radiation sensor 56, as well as reads the temperature set by the temperature setting device 58, and then calculates a target blowing temperature TAO according to the following expression.

$$TAO = K1 \times Tset - K2 \times Tr - K3 \times To - K4 \times ST + C$$

In this expression, Tset represents the set temperature, Tr represents the cabin temperature, To represents the outside temperature, ST represents the amount of solar radiation, and K1, K2, K3, K4, and C represent constants.

During normal control when the an occupant is in the vehicle and the ignition is on, the control apparatus compares a post evaporator 18 air temperature which prevents the windshield glass from fogging with the target blowing temperature TAO or a temperature with some leeway around the target blowing temperature TAO (such as a temperature that is slightly lower than the target blowing temperature), and controls the speed of the compressor 12 by controlling the motor 20 so that the post evaporator 18 air temperature matches whichever is lower.

Next, in order to control the blowing temperature to the target blowing temperature, the control apparatus 46 calculates a mixture ratio r, which is the ratio of warm air that passes through the heater core 38 to the cold air that bypasses the heat core 38, according to the following expression.

$$r = (TAO - Te)/(Th - Te)$$

In this expression, Te represents the post evaporator air temperature detected by a sensor provided downstream of the evaporator 18, and Th represents the air temperature immediately downstream of the heater core. Th may be directly detected by a sensor provided downstream of the heater core or may be calculated according to the following expression.

$$Th = A \times Tw + (1 - A) \times Te$$

In this expression, Tw represents the temperature of engine coolant and A represents a constant equal to or less than 1.

Also, the engine coolant temperature is controlled to a substantially constant value by a thermostat so the Th may also be obtained based on this value.

Next, an opening amount S of the air mix damper 36 to achieve the calculated mixture ratio r is calculated according to the following expression.

$$S = F1(r)$$

In this expression, F1 (x) represents a function.

The control apparatus 46 then drives the air mix damper actuator 40 so that the air mix damper 36 is driven to the calculated opening amount.

The post evaporator 18 air temperature is then set to the lower of the post evaporator temperature for preventing the windshield glass from fogging and the target blowing temperature. Thus, the windshield glass can be prevented from fogging and the cabin interior can be maintained at the target temperature.

Figure 2:
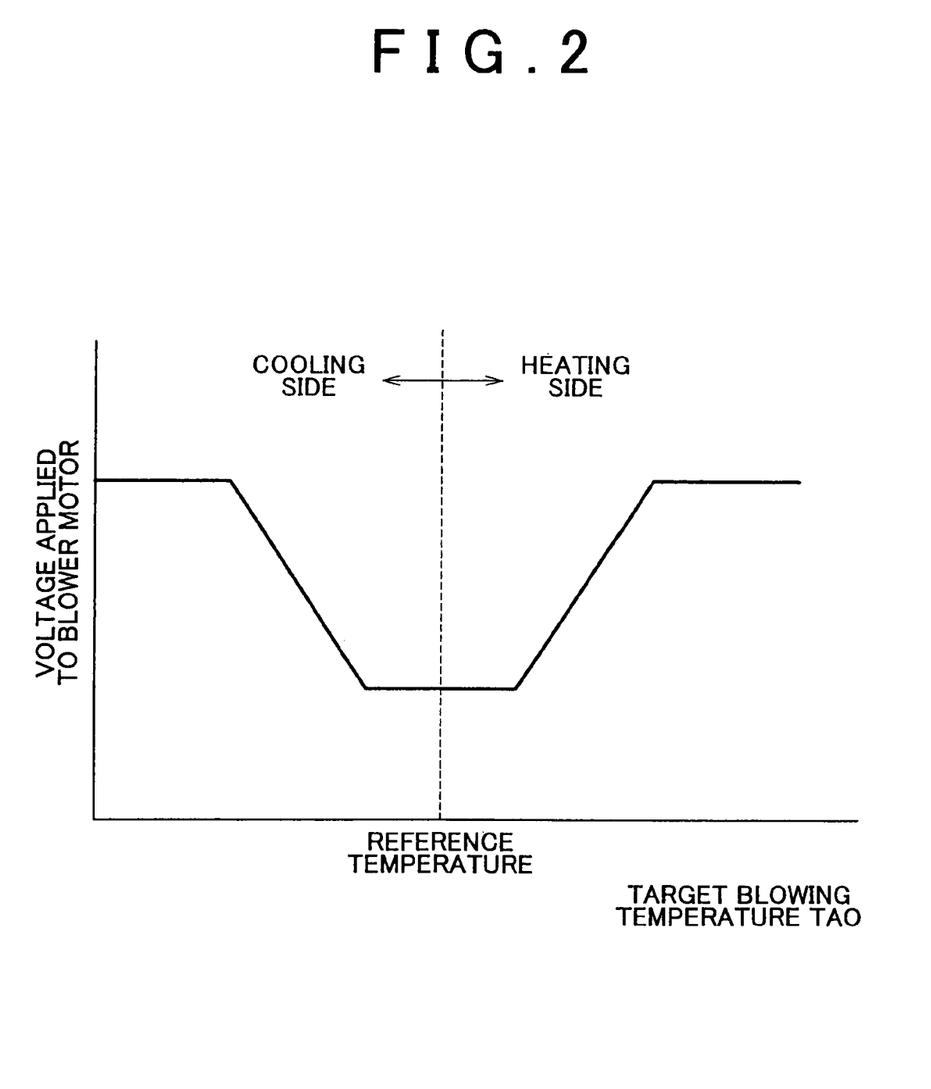
FIG. 2 is a view of a map for setting the voltage applied to a blower motor with respect to a target blowing temperature.

Also, the control apparatus 46 stores a map for setting the voltage applied to the blower motor 34 with respect to the target blowing temperature, shown in FIG. 2, and calculates the voltage to be applied to the blower motor 34 of the blower fan 27 from the target blowing temperature according to this map. The control apparatus 46 then outputs a signal to the blower fan flowrate control unit 48 so that air of the target blowing temperature is blown. The map for setting the voltage to be applied to the blower motor 34 with respect to the target blowing temperature shown in FIG. 2 shows one example in which the dotted line portion represents a reference temperature and voltage applied to the blower motor 20 is set to increase, such that the air blowing amount increases, gradually as the target blowing temperature shifts farther toward the low temperature side (i.e., the cooling side) and the high temperature side (i.e., the heating side) with respect to the reference temperature shown by the dotted line portion.

Also, when air is blown, the air inlets 24 and 26 and the air outlets 28A, 28B, and 28C are switched by driving the respective damper actuators, which is done by outputting a signal from the control apparatus 46 in response to an operation or the like of the temperature setting device 58 or the like by the occupant.

Next, a routine will be described which is executed by the control apparatus 46 when there is an air conditioning command according to remote control or a timer setting or the like while the vehicle is parked.

Figure 3:
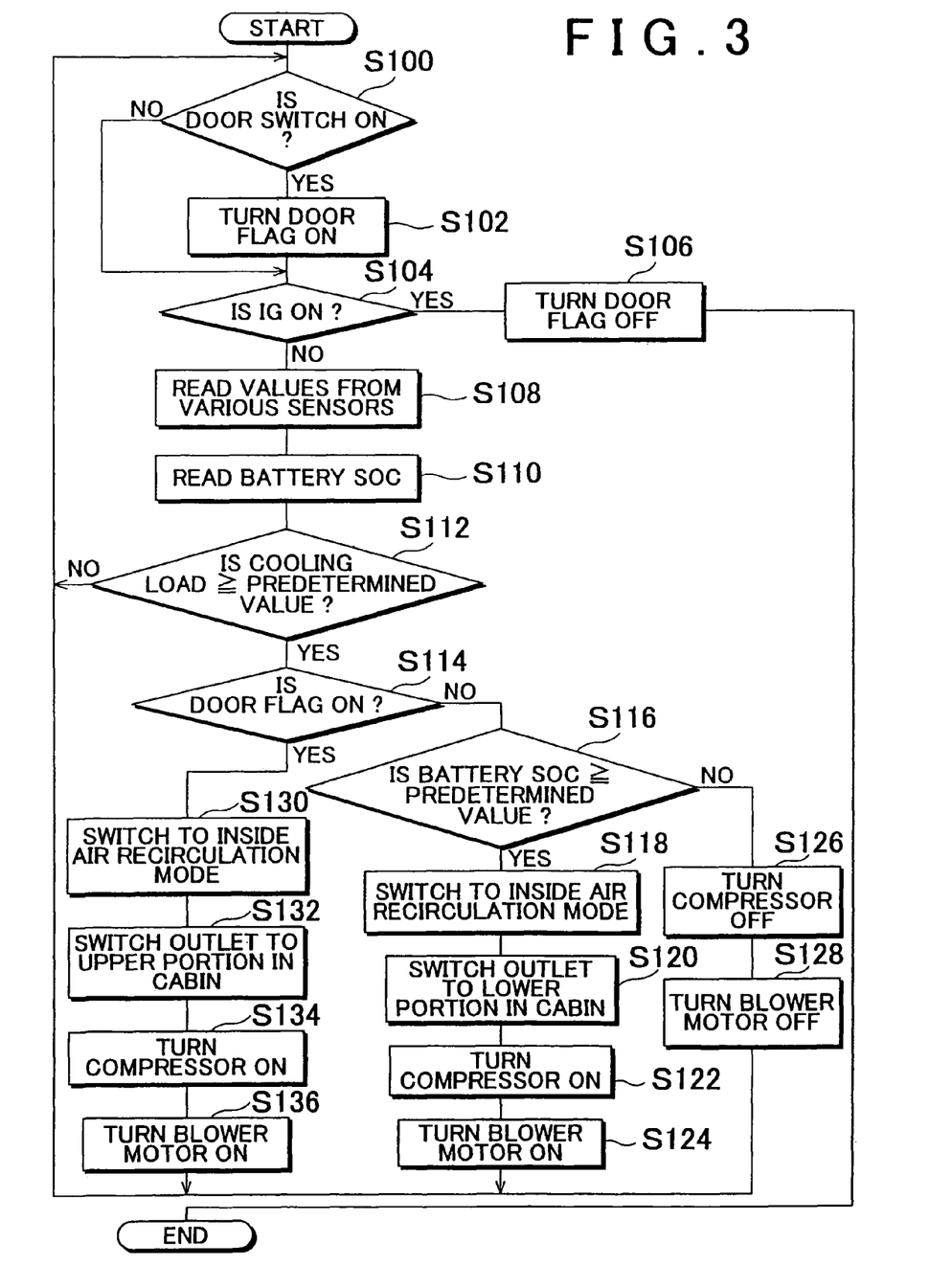
FIG. 3 is a flowchart illustrating one example of a routine performed during pre-air conditioning by a control apparatus of the air conditioning system for a vehicle according to the example embodiment of the invention.

FIG. 3 is a flowchart illustrating one example of a routine that is executed during pre-air conditioning by the control apparatus of the air conditioning system 10 according to the example embodiment of the invention.

When there is a command to perform pre-air conditioning according to remote control or a timer setting or the like while the vehicle is parked, it is first determined in step 100 whether the door switch 60 is on. This determination predicts that an occupant may get into the vehicle when an open door is detected by the door switch 60 being on. If the determination in step 100 is yes, the process proceeds on to step 102. If the determination is no, however, the process skips to step 104.

In step 102, a door flag indicating that the door was opened and an occupant got into the vehicle is turned on and the process proceeds on to step 104.

In step 104, it is determined whether an occupant has gotten into the vehicle and turned the ignition (IG) on. If the determination in step 104 is yes, then the process proceeds on to step 106 where the door flag is turned off, if it was on, and the routine for pre-air conditioning ends. That is, the pre-air conditioning ends and typical air conditioning control or the like is performed.

If, on the other hand, the determination in step 104 is no, the process proceeds on to step 108 where the various sensor values are read, after which the process proceeds on to step 110. That is, the set values of the outside air temperature sensor 52, the cabin temperature sensor 54, the solar radiation sensor 56, and the temperature setting device 58 are read.

In step 110, the state-of-charge (SOC) of the battery 64 that was detected by the SOC detector 62 is read and the process proceeds on to step 112.

In step 112, it is determined whether a cooling load is equal to or greater than a predetermined value. This determination is made by calculating the foregoing target blowing temperature and determining whether that target blowing temperature is equal to or greater than the predetermined value. If the determination in step 112 is no, the process returns to step 100 and the process is repeated. If the determination in step 112 is yes, on the other hand, the process proceeds on to step 114. That is, when pre-air conditioning is performed, air conditioning is prohibited until the cooling load becomes equal to or greater than the predetermined value. In other words, pre-air conditioning is performed when the cooling load is equal to or greater than the predetermined value, which inhibits air conditioning from being performed more than is necessary, thus making it possible to save energy. Also, when the ignition is turned on and the air conditioning mode shifts to normal air conditioning, the cooling load will no longer become too great so air conditioning can be performed efficiently.

In step 114, it is determined whether the door flag is on. If the determination is no, the process proceeds on to step 116. If the determination is yes, on the other hand, the process proceeds on to step 130.

In step 116, it is determined whether the battery SOC (i.e., the amount of electricity stored in the battery) is equal to or greater than a predetermined value. That is, it is determined whether the SOC of the battery 64 that was detected by the SOC detector 62 read in step 110 is equal to or greater than a predetermined value. If the determination is yes, the process proceeds on to step 118. If the determination is no, on the other hand, the process proceeds on to step 126.

In step 118, the mode is switched to the inside air recirculation mode and the process proceeds on to step 120. That is, the inlet switching damper actuator 32 is driven to operate the inlet switching damper 30 so as to open the air inlet 24.

Next in step 120, the outlet is switched to the outlet in the lower portion of the vehicle cabin, after which the process proceeds on to step 122. That is, the outlet switching damper actuator 44 is driven to operate the outlet switching damper 42 so as to open the outlet 28C (Heat).

In step 122, the compressor is turned on, after which the blower motor 34 is turned on in step 124. The process then returns to step 100 and repeats. Pre-air conditioning is thus started in the manner described above. That is, pre-air conditioning is started when the SOC of the battery 64 is equal to or greater than a predetermined value. Then when the pre-air conditioning starts, control is performed to blow cold air into the lower portion in the vehicle cabin such that cold air is blown into that lower portion. Because the inlet 24 is located in the lower portion in the vehicle cabin, that cooled air is drawn in and cooled which enables the lower portion in the vehicle cabin to be cooled efficiently.

In steps 118 to 124, when the compressor 12 is driven, its speed may be made relatively slow or changed according to the cooling load (e.g., the target blowing temperature, the cabin temperature and the like). Also, the speed of the compressor 12 may be compared with a speed that is preset according to the SOC of the battery 64 and then set at whichever speed is slower.

If, on the other hand, the determination in step 116 is no, i.e., if the SOC of the battery 64 is less than the predetermined value, the process proceeds on to step 126 where the compressor is turned off. The blower motor 34 is then turned off in step 128 and the process returns to step 100 and repeats. That is, pre-air conditioning is prohibited when the SOC of the battery 64 is low. As a result, accurate pre-air conditioning can be performed that corresponds to the SOC of the battery 64, thus making it possible to prevent the battery 64 from draining and a case in which the process described above for blowing cold air toward an occupant when the occupant gets into the vehicle is no longer able to be performed.

Also, if the determination in step 114 is yes, i.e., if the door flag is on such that it is assumed that an occupant has gotten into the vehicle, the process proceeds on to step 130 where the mode is switched to the inside air recirculation mode, after which the process proceeds on to step 132. That is, the inlet switching damper actuator 32 is driven to operate the inlet switching damper 30 so as to open the air inlet 24.

Next, in step 132, the outlet is switched to the outlet at the upper portion in the vehicle cabin, after which the process proceeds on to step 134. That is, the outlet switching damper actuator 44 is driven to operate the outlet switching damper 42 so as to open the outlet 28B (Vent).

Then the compressor 12 is turned on in step 134 and the blower motor 34 is turned on in step 136, after which the process returns to step 100 and repeats. The routine ends and a shift is made to normal air conditioning control at the point when the ignition is turned on, i.e., when the determination in step 104 is yes.

That is, in this example embodiment, the air inlet 24 draws in air from the lower portion in the vehicle cabin. As a result, cold air can be efficiently blown toward the occupant by drawing in cold air from the lower portion in the vehicle cabin that was cooled by the pre-air conditioning in steps 118 to 124 and blowing it into the upper portion in the vehicle cabin. Accordingly, cold air can be supplied early on to the upper body such as the face and head area of an occupant that requires a low temperature for comfort, thereby enabling the occupant to be comfortable from the moment he/she gets into the vehicle. Furthermore, in this example embodiment, the pre-air conditioning in steps 118 to 124 make the lower portion in the vehicle cabin a low temperature space. Therefore, even if the battery SOC drops thereafter such that the determination in step 116 is no and pre-air conditioning is prohibited, the two levels of air temperatures in the vehicle cabin, i.e., the low temperature at the lower portion and the higher temperature at the upper portion, can still be maintained despite the fact that the temperature of the low temperature space in the lower portion in the vehicle cabin will gradually rise, because the low temperature air is heavier. As a result, when an occupant then gets into the vehicle and steps 130 to 136 are executed such that cold air is blown toward the occupant, the occupant can still be made comfortable even though the effect is reduced.

Accordingly, by performing the steps described above when there is a command to perform pre-air conditioning, the occupant no longer has to wait in a hot environment after getting into the vehicle before the air conditioning provides cooling, as was conventionally the case. Rather, a comfortable environment can be provided from the time the occupant gets into the vehicle. In addition, when the occupant is in the vehicle, a low temperature space is created in the lower portion of the vehicle cabin. Low temperature air is drawn in from this low temperature space, cooled by the evaporator 18, and blown toward the upper body of the occupant. As a result, cooling can be performed efficiently and with less energy. Also, creating a space of low temperature air having a large specific gravity in the lower portion in the vehicle cabin is both effective and saves energy because the cold air does not easily mix with the warmer air. Also, the cooling load is also low, which also saves energy, because the low temperature space is created in the lower portion of the vehicle cabin which receives less solar radiation and thus has a smaller cooling load. Further, only a portion of space, i.e., the lower portion of the vehicle cabin, is used so it can be cooled with a small load, which also saves energy.

Figure 4A:
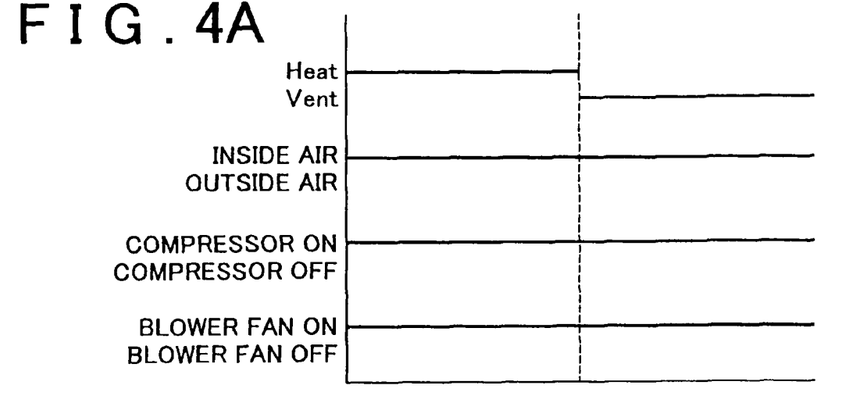
FIGS. 4A to 4C are a view of a time chart showing the air outlet switching timing, mode switching timing, compressor on/off timing, and blower fan on/off timing performed by the air conditioning system for a vehicle according to the example embodiment of the invention, as well as that time chart according to a modified example.
Figure 4B:
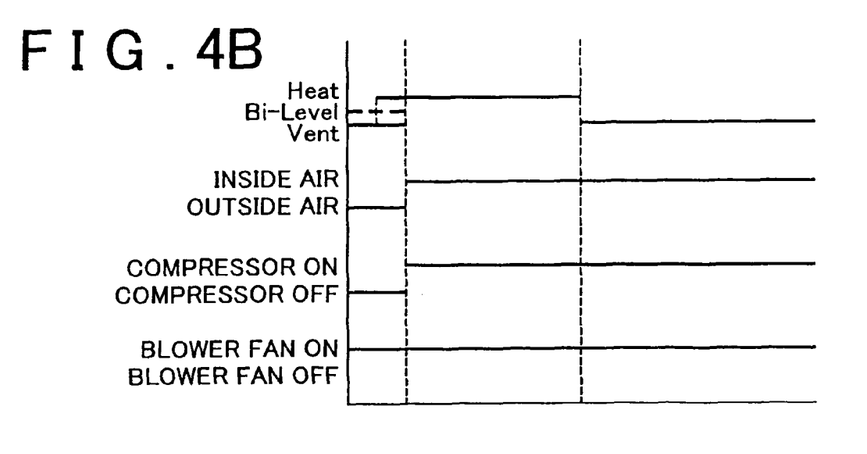

In the foregoing example embodiment, as shown in FIG. 4A, when there is a command to perform pre-air conditioning, the compressor 12 and the blower fan 27 turn on with the outlet 28C (Heat) selected to blow air into the lower portion in the vehicle cabin in the inside air recirculation mode. Then when the door switch 60 turns on and an occupant gets into the vehicle (at the timing shown by the dotted line in FIGS. 4A to 4C), the outlet switches from the outlet 28C (Heat) to the outlet 28B (Vent). Alternatively, however, as shown in FIG. 4B, for an initial predetermined period of time the compressor 12 may be turned off and the blower fan 27 turned on in a Bi-level mode (i.e., a mode which blows air from both of the outlets 28B and 28C into both the upper and lower portions in the vehicle cabin) or a Vent mode (i.e., a mode which blows air from the outlet 28C into the lower portion in the vehicle cabin). Then after the air has been changed, the mode may be switched to a Heat mode (i.e., a mode which blows air from the outlet 28C into the lower portion in the vehicle cabin) and air conditioning performed for a predetermined period of time in that mode, after which the compressor 12 may be turned on and the mode switched to the inside air recirculation mode. At this time, instead of performing air conditioning for a predetermined period of time, air conditioning may be performed until the cooling load (the target blowing temperature) becomes equal to or less than a predetermined value. Or, in order to prevent the period of time for creating the low temperature space in the lower portion of the vehicle cabin from becoming shorter due to expelling warm air indefinitely with the compressor 12 off, either the predetermined period of time or the time that it takes for the cooling load to become equal to or less than a predetermined value, which ever is shorter, may be selected. As a result, the pre-air conditioning starts after the warm air has been expelled from the upper portion in the vehicle cabin, which enables the pre-air conditioning to be done efficiently and with less energy.

Figure 4C:
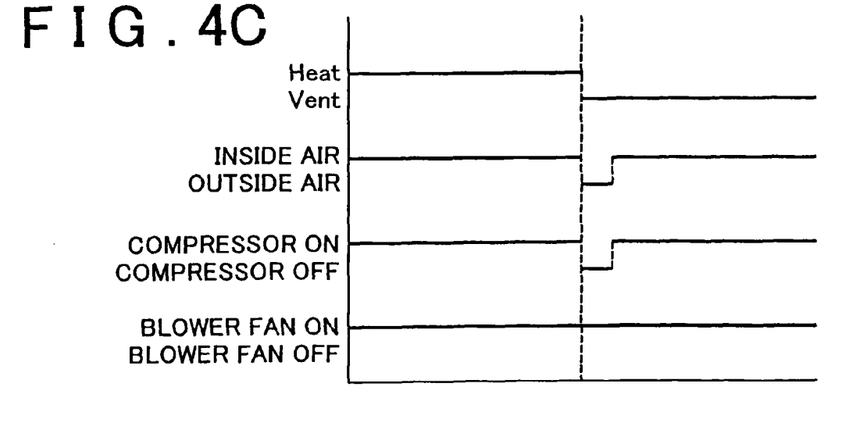

Alternatively, as shown in FIG. 4C, up until the occupant gets into the vehicle (i.e., until the dotted line in FIG. 4C), the process may be the same as that in the foregoing example embodiment, but then for an initial predetermined period of time after the occupant gets into the vehicle, the compressor 12 may be turned off and the mode switched to the outside air introduction mode in which the blower fan 27 is turned on and the air in the upper portion in the vehicle cabin is changed. Then after that initial predetermined period of time, the compressor 12 may be turned on and the mode switched to the inside air recirculation mode, after which a process like that in the foregoing example embodiment may be performed. As a result, cold air is blown into the upper portion in the vehicle cabin (i.e., toward the occupant) after the warm air has been expelled from the upper portion in the vehicle cabin, which improves the cooling efficiency and makes it possible to give the occupant a comfortable sensation even earlier.

Moreover, FIG. 4B and FIG. 4C may be combined. That is, during the initial period at the start of pre-air conditioning and when the occupant gets into the vehicle, outside air may be introduced and the warm air in the upper portion of the vehicle cabin expelled. Also, in FIGS. 4B and 4C, while outside air is being introduced into the vehicle cabin, the compressor 12 is turned off, but it may also be turned on.

Further, in the foregoing example embodiment, cold air is drawn in from the lower portion in the vehicle cabin. Accordingly, the inlet 24 from the lower portion in the vehicle cabin may be extended by a duct or the like and air may be drawn in from near the floor. Or, the gap in the lowest portion of the instrument panel may be widened such that air can be more easily drawn in from near the floor.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. An air conditioning system for a vehicle which is capable of performing pre-air conditioning in which a vehicle cabin is air conditioned before an occupant gets into the vehicle, comprising:
    an inlet in which an air intake source is changeable;
    an outlet in which the blowing direction of either air that has been drawn in from the inlet or air that has been drawn in from the inlet and cooled using a refrigerant cycle which a circulates refrigerant is changeable;
    predicting means for predicting that an occupant will get into the vehicle; and
    controlling means for blowing cooled air from the outlet toward a lower portion in the vehicle cabin during the pre-air conditioning,
    wherein the controlling means draws in air from the lower portion in the vehicle cabin through the inlet and blows cooled air from the outlet toward an upper portion in the vehicle cabin when it is predicted that the occupant will get into the vehicle by the predicting means.

2. The air conditioning system for a vehicle according to claim 1, wherein during the pre-air conditioning the controlling means first controls the air conditioning system to draw in outside air from the inlet and blow air from the outlet.

3. The air conditioning system according to claim 1, further comprising:
    calculating means for calculating a cooling load necessary to bring the temperature in the vehicle cabin to a target temperature,
    wherein during the pre-air conditioning the controlling means controls the air conditioning system to draw in outside air from the inlet and blow air from the outlet until a calculation result of the calculating means becomes equal to or less than a predetermined value.

4. The air conditioning system according to claim 1, wherein when it has been predicted by the predicting means that the occupant will get into the vehicle, the controlling means controls the air conditioning system to first draw in outside air from the inlet and blow air from the outlet toward the upper portion in the vehicle cabin for a predetermined period of time, and then draw in air from the lower portion in the vehicle cabin by the inlet and blow cooled air from the outlet to the upper portion in the vehicle cabin.

5. The air conditioning system according to claim 1, further comprising:
    calculating means for calculating a cooling load necessary to bring the temperature in the vehicle cabin to a target temperature,
    wherein the controlling means controls the air conditioning system to start the pre-air conditioning when a calculation result of the calculating means is equal to or greater than a predetermined value.

6. The air conditioning system according to claim 1, wherein the controlling means detects an amount of electricity stored in electrical storing means for storing electric power used to drive a compressor for circulating the refrigerant of the refrigerant cycle, and prohibits the pre-air conditioning when the detected amount of electricity stored is less than a predetermined value.

7. An air conditioning method for a vehicle provided with an air conditioning system which is capable of performing pre-air conditioning in which a vehicle cabin is air conditioned before an occupant gets into the vehicle and which includes an inlet in which an air intake source is changeable, and an outlet in which the blowing direction of either air that has been drawn in from the inlet or air that has been drawn in from the inlet and cooled using a refrigerant cycle which circulates a refrigerant is changeable, comprising the steps of:
    blowing cooled air from the outlet toward a lower portion in the vehicle cabin during the pre-air conditioning; and
    drawing in air from the lower portion in the vehicle cabin through the inlet and blowing cooled air from the outlet toward an upper portion in the vehicle cabin when it has been predicted that the occupant will get into the vehicle.

8. The air conditioning method according to claim 7, wherein during the pre-air conditioning the air conditioning system is first controlled to draw in outside air from the inlet and blow air from the outlet.

9. The air conditioning method according to claim 7, further comprising the step of:
    calculating a cooling load necessary to bring the temperature in the vehicle cabin to a target temperature,
    wherein during the pre-air conditioning the controlling means controls the air conditioning system to draw in outside air from the inlet and blow air from the outlet until a calculation result of the calculating means becomes equal to or less than a predetermined value.

10. The air conditioning method according to claim 7, wherein when it is predicted that the occupant will get into the vehicle, the air conditioning system is controlled to first draw in outside air from the inlet and blow air from the outlet toward the upper portion in the vehicle cabin for a predetermined period of time, and then draw in air from the lower portion in the vehicle cabin by the inlet and blow cooled air from the outlet to the upper portion in the vehicle cabin.

11. The air conditioning method according to claim 7, further comprising the step of:
    calculating a cooling load necessary to bring the temperature in the vehicle cabin to a target temperature,
    wherein the air conditioning system is controlled to start the pre-air conditioning when a calculation result of the calculating means is equal to or greater than a predetermined value.

12. The air conditioning method according to claim 7, wherein an amount of electricity stored in electrical storing means for storing electric power used to drive a compressor for circulating the refrigerant of the refrigerant cycle is detected, and the pre-air conditioning is prohibited when the detected amount of electricity stored is less than a predetermined value.

13. An air conditioning system for a vehicle which is capable of performing pre-air conditioning in which a vehicle cabin is air conditioned before an occupant gets into the vehicle, comprising:

an inlet in which an air intake source is changeable;

an outlet in which the blowing direction of either air that has been drawn in from the inlet or air that has been drawn in from the inlet and cooled using a refrigerant cycle which a circulates refrigerant is changeable;

a predicting device that predicts that an occupant will get into the vehicle; and a controller that blows cooled air from the outlet toward a lower portion in the vehicle cabin during the pre-air conditioning, wherein the controller draws in air from the lower portion in the vehicle cabin through the inlet and blows cooled air from the outlet toward an upper portion in the vehicle cabin when it is predicted that the occupant will get into the vehicle by the predicting device.

* * * * *